United States Patent [19]
Kaneko et al.

[11] Patent Number: 6,038,046
[45] Date of Patent: Mar. 14, 2000

[54] BRANCHING SYSTEM WITH OPTICAL ADD DROP MULTIPLEXING FUNCTION

[75] Inventors: Tomoyuki Kaneko; Shohei Yamaguchi, both of Tokyo, Japan

[73] Assignee: NEC Corporation, Japan

[21] Appl. No.: 08/975,380

[22] Filed: Nov. 20, 1997

[30] Foreign Application Priority Data

Nov. 21, 1996 [JP] Japan .................................. 8-310905
Aug. 25, 1997 [JP] Japan .................................. 9-228637

[51] Int. Cl.[7] ............................. H04J 14/02; H04B 10/08
[52] U.S. Cl. ........................... 359/130; 359/124; 359/110
[58] Field of Search .................................. 359/127, 128, 359/130, 124

[56] References Cited

U.S. PATENT DOCUMENTS

| 5,717,795 | 2/1998 | Sharma et al. | 385/24 |
| 5,926,300 | 7/1999 | Miyakawa et al. | 359/124 |
| 5,933,258 | 8/1999 | Flanagan et al. | 359/110 |

FOREIGN PATENT DOCUMENTS 7-154311   6/1995   Japan .

Primary Examiner—Jason Chan
Assistant Examiner—Dalzid Singh
Attorney, Agent, or Firm—Ostrolenk, Faber, Gerb & Soffen, LLP

[57] ABSTRACT

A branching system having an optical ADM, where the optical ADM comprises a first optical circulator being connected to a main signal transmission line input, a first FBG having an input which is an output of the first optical circulator, an optical isolator having an input which is an output of the first FBG, a second optical FBG having an input which is an output of the optical isolator and a second optical circulator having an input which is an output of the second FBG. With this structure, the optical amplifier is able to detect whether the branch transmission line is being cut off due to obstructions. Thus, even if a detour route of light being branched off at the optical circulator is generated, for the light is intercepted by the optical isolator, there should be no generation of a loop. Thus, deterioration on the transmission feature of the main transmission line can be prevented.

9 Claims, 10 Drawing Sheets

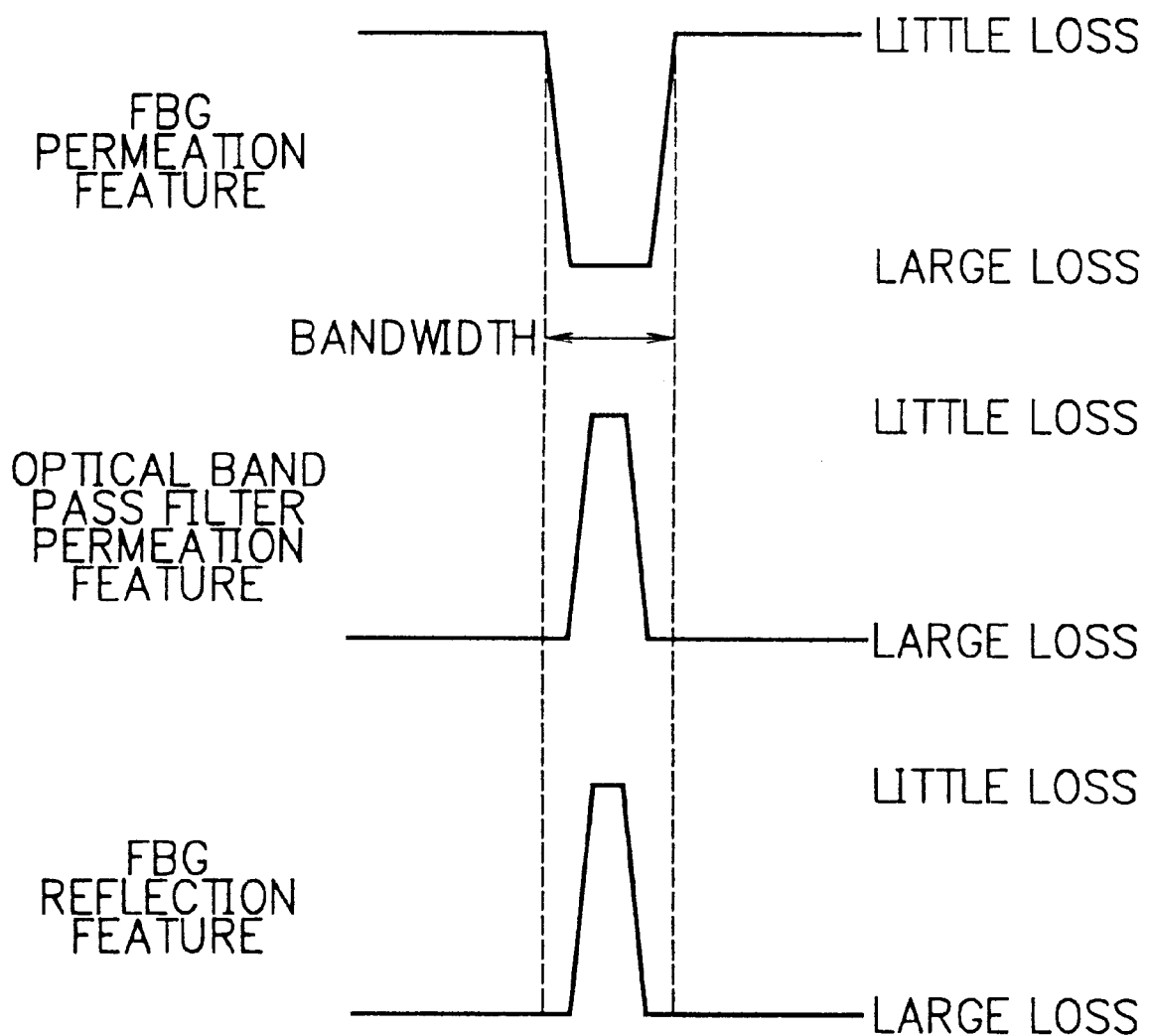

BRANCHING SYSTEM WITH OPTICAL ADD DROP MULTIPLEXING FUNCTION

BACKGROUND OF THE INVENTION

The present invention relates to, for example, a branching system for branching or inserting a particular wavelength at a transmission line which is being wavelength division-multiplexed (WDM) or being wavelength multiplexed.

DESCRIPTION OF THE RELATED ART

One example of a conventional branching system is to be illustrated with reference to FIGS. 1 to 3. Conventionally, the branching systems are generally constructed in a way shown in FIG. 1. In FIG. 1, a main signal transmission line input of a branching system 55 is connected to an input of an optical switch (SW) 6. One output of the optical switch 6 is connected to an input of an optical ADM 1, while the other output of the optical switch 6 is connected to a first input of an optical coupler 3. A second input of the optical coupler 3 is connected to an output of the optical ADM 1. An output of the optical coupler 3 is connected to a main signal transmission line output of the branching system 55. An optical branch signal line output of the optical ADM 1 is connected to a branch transmission line output of the branching system 55, while an optical insertion signal line input of the optical ADM 1 is connected to a branch transmission line input of the branching system 55.

First of all, with regard to the above mentioned construction of the conventional branching system, a description of an optical branching and insertion in the wavelength multiplex transmission will be given. In FIG. 2, a signal in which a plurality of wavelengths $\lambda1-n$ are multiplexed is transmitted from a terminal office A to a terminal office B. Then among the wavelengths $\lambda1-n$, a particular wavelength $\lambda i$ is to be branched off by the branching system so as to be transmitted to a terminal office C. On the other hand, the same wavelength $\lambda i$ is transmitted from the terminal office C to the branching system where the wavelength is integrated and transmitted to the terminal office B as the wavelengths $\lambda1-n$. Under this particular situation, in such a case where the transmission line between the terminal offices A and B, and the branch office C and the branching system are rather long and the signal is to become small, optical amplifiers for amplifying the signal are to be adopted in adequate places on the transmission line.

Next, the operation of the conventional branching system is to be described. According to FIG. 1, the optical switch 6 is connected to the input of the optical ADM 1 under the normal conditions. Under this state, the wavelengths $\lambda1-n$ are to be inputted to the main signal transmission line input of the branching system 55 before passing through the optical switch 6 so as to be inputted to the input of the optical ADM 1. At this point, a particular wavelength $\lambda i$ among the wavelengths $\lambda1-n$ being inputted to the optical ADM 1 is to be branched and transmitted to the branch transmission line output of the branching system 55 so as to be sent to the branch office C. On the other hand, the wavelength $\lambda i$ from the branch office C is to be transmitted to the branch transmission line input of the branching system 55 so as to be inputted to the optical insertion signal line of the optical ADM 1. Then at this point, the wavelength $\lambda i$ is to be integrated with the main signals $\lambda1-h$ and $\lambda j-n$, with a result that wavelengths $\lambda1-n$ are transmitted to the main signal transmission line output of the branching system 55 passing through the optical coupler 3, so as to be sent to the terminal office B.

Under this method, for example, in such a case where the optical fiber cable between the branching system and the branch office C is being cut off, the wavelength $\lambda i$ is not to be inputted to the branch transmission line input of the branching system 55 which results in a situation where the wavelength $\lambda i$ is not capable of being transmitted to the terminal office B. In order to prevent this from happening, there is provided the optical switch 6. When voltage Vo is applied to the optical switch 6, the output of the optical switch 6 is switched to the input of the optical coupler 3. Thereby, the wavelengths $\lambda1-n$ are to be transmitted to the main signal transmission line of the branching system 55 without being branched off. As a result, the wavelengths $\lambda1-n$ are to be transmitted to the terminal office B. The state of on or off of the voltage Vo can be determined by the presence or absence of the power supply from the branch office.

Here, the mechanism for determining the sate of on or off of the voltage Vo by the presence or absence of the power supply from the branch office is to be described. A block diagram of a feeder circuit 65 is shown in FIG. 3. A constant current is supplied to the terminal office B from the terminal office A, while the current direction is not necessarily regulated. The reason for which no particular direction is given for the current is as follows: when the terminal office A is positive (+) and the terminal office B is negative (−), the current flows in the direction indicated by the following arrows RD8→RZ12→RD11; on the other hand, when the terminal A is negative and the terminal office B is positive, the current flows in the direction shown in the following arrows RD9→RZ12→RD10. In other words, the reason for which the current direction is not necessarily decided is that the direction of the current flowing to RZ12 is constant.

Moreover, the current supply for the branch office C is usually fixed where the switch of rl opens due to letting the current flow, while the switch of rl closes when the current is not flowing. That is to say, when the branch office C has a power supply, the voltage Vo is not applied, while the voltage Vo is applied when there is no power supply.

As to another conventional example within a technical field similar to the present invention, there is a "Submarine Branching System" disclosed in Japanese Patent Laid-Open Publication No. 7-154311. This conventional example has to do with a branching system which is capable of effectively utilizing optical submarine cables in such a case where a plurality of optical submarine cables are damaged.

However, concerning the conventional example mentioned above, the first problem is that, as it is shown in FIG. 2, with regard to the long distance system, the optical amplifiers are positioned on the transmission line utilizing the intervals thereof, where the relay intervals of the optical amplifiers before and behind the branching system are shortened.

For example, since the transmission loss of the optical fiber is 0.2 dB/Km, as the insertion loss further increases and becomes 6 dB (2 dB within the optical ADM, and 4$d$ for the sum of optical switch and optical coupler). the relay interval is to be shorten by the length of 30 Km. Therefore, if the optical amplifier is system designed so as to operate with a relay interval of a length shorter than 30 Km. the branching system of this type is not workable.

The reason for that is that, as it is shown in FIG. 1, the optical switch 6 and the optical coupler 3 are inserted on the main signal transmission line which leads to an increase of insertion loss.

SUMMARY OF THE INVENTION

It is therefore an object of the present invention to provide a branching system capable of controlling the insertion loss of the main transmission line without branching off the main transmission line. Furthermore, it is also an object of the present invention to provide a branching system where the optical ADM within the branching system is constructed with an optical circulator and a FBG. where the transmission feature of the main transmission line does not deteriorate even when the branch signal has to detour at the optical amplifier due to obstructions on the transmission line of the branching side.

According to a first aspect of the present invention, there is provided a branching system comprising: an optical ADM with two inputs and two outputs for branching or inserting a particular wavelength from a plurality of wavelengths; a first optical coupling device with one input and two outputs for controlling optical coupling among the one input and the two outputs thereof; a second optical coupling device with two inputs and one output for controlling the optical coupling among the two inputs and one output thereof; and an optical amplifier for amplifying the optical signal, said optical ADM having a first input connected to a main signal transmission line input of the branching system, a first output connected to a main signal transmission line output of the branching system, a second input connected to the second optical coupling device and a second output connected to the first optical coupling device, said first optical coupling device having a first output connected to the branch transmission line output of the branching system and a second output connected to an input of the optical amplifier, said second optical coupling device having a first input connected to the branch transmission line input of the branching system and a second input connected to an output of the optical amplifier. Thus, owing to the present structure, the present invention has the optical ADM function for branching or inserting a particular wavelength from a plurality of wavelengths in the WDM transmission.

Moreover, it is preferable if the above mentioned first and/or the second optical coupling device(s) are/is (an) optical coupler(s) or (an) optical switch(es).

Furthermore, according to a second aspect of the present invention, there is provided a branching system where the optical ADM comprises: a first optical circulator with one input and two outputs; a first optical diffraction device with one input and one output; an optical isolator with one input and one output; a second optical diffraction device with one input and one output; and a second optical circulator with two inputs and one output, said first optical circulator having an input connected to the main signal transmission line input, a first output connected to the first optical coupling device and a second output connected to the input of the first optical diffraction device, said optical isolator having an input connected to the output of the first optical diffraction device and an output connected to an input of the second optical diffraction device, said second optical circulator having a first input connected to an output of the second optical diffraction device and a second input connected to the second optical coupling device.

In addition, it is preferable if the above mentioned first and/or the second optical diffraction device(s) are/is (an) fiber black grating(s).

Moreover, according to a third aspect of the present invention, there is provided a branching system where the optical ADM comprises: a first optical circulator with one input and two outputs; an optical diffraction device with one input and one output; and a second optical circulator with two inputs and one output, said first optical circulator having an input connected to the main signal transmission line input, a first output connected to the first optical coupling device and a second output connected to the input of the optical diffraction device, said optical diffraction device having an output connected to an input of the second optical circulator, said second optical circulator having a first input connected to an output of the optical diffraction device, a second input connected to the second optical coupling device and an output connected to the main signal transmission line output, a bandwidth permeation device being connected in between an output of the optical amplifier and an input of the second optical coupling device.

It is preferable that the above mentioned bandwidth permeation device is a band pass filter or that it should have a structure consisting of an optical circulator and an optical diffraction device.

Furthermore, it is preferable that the above mentioned optical diffraction device is a fiber black grating.

The above and further objects and the novel feature of the invention will more fully appear from the following detailed description when the same is read in connection with the accompanying drawings. It is to be expressly understood, however, that the drawings are for illustration only and are not intended as a definition of the limits of the invention.

BRIEF DESCRIPTION OF THE DRAWINGS

FIG. 10 is a view showing a bandwidth feature of a FBG and a bandwidth feature of a bandwidth permeation device applied in the present invention.

DESCRIPTION OF THE PREFERRED EMBODIMENTS

Figure 1:
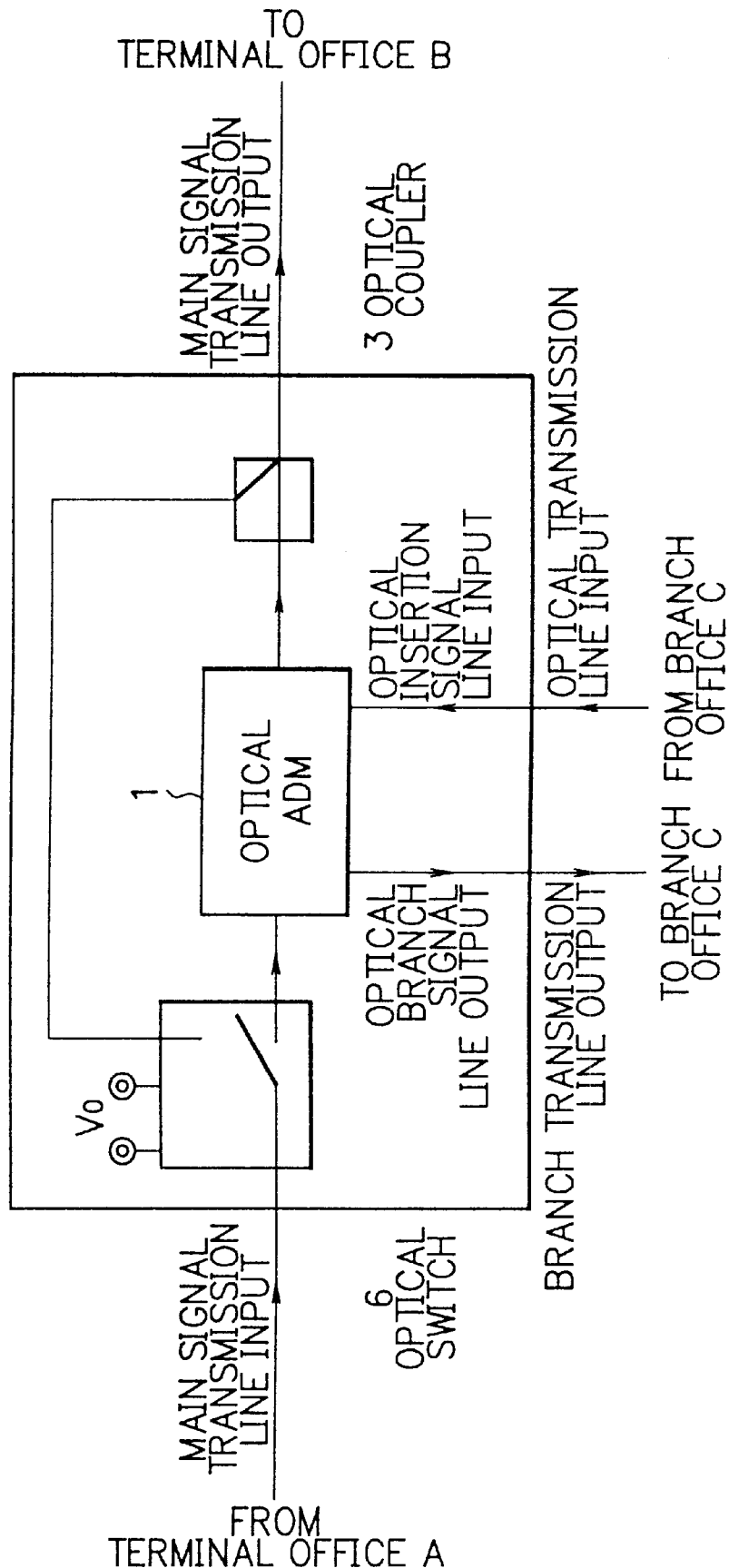
FIG. 1 is a block structural diagram of a conventional branching system.

Referring now to the drawings, a branching system of the present invention will become apparent from the following detailed description of the preferred embodiments of the invention. Four embodiments of a branching system according to the present invention are shown with reference to FIGS. 4 to 10.

Figure 4:
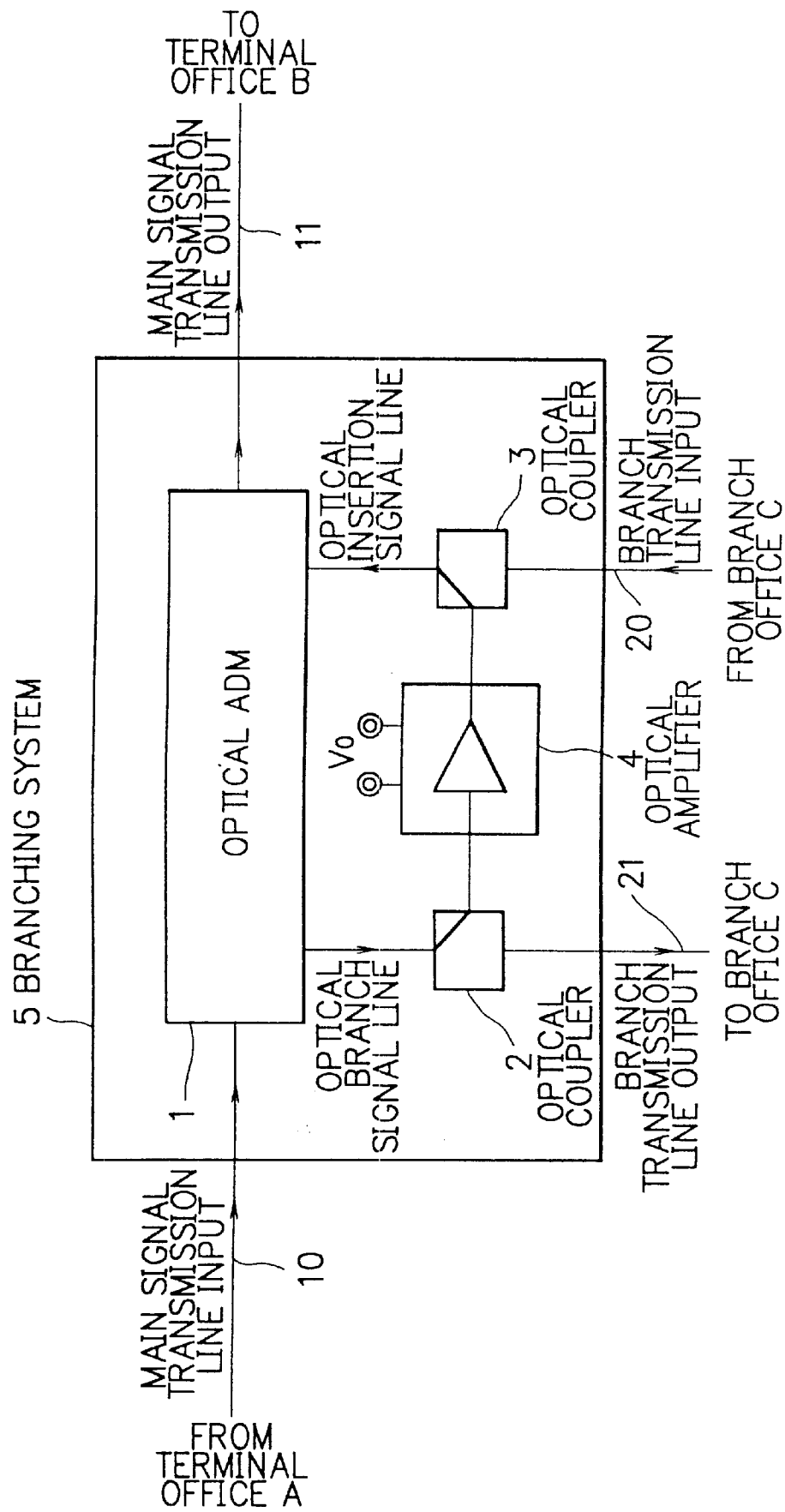
FIG. 4 is a block diagram showing a branching system of a first embodiment of the present invention.

FIG. 4 is a block diagram of a first embodiment of the branching system of the present invention. A branching system 5 of the present embodiment consists of an optical ADM 1, two optical couplers 2 and 3, and an optical amplifier 4.

The branching system 5, for example, is an optical branching system for branching or inserting a light having a particular wavelength on the transmission line being conducted the WDM (wavelength division multiplexing). The branching system 5 is an optical wavelength multiplexing system consisting of two inputs 10 and 20, and two outputs 11 and 21. Among the mentioned inputs and outputs, a first input is a main signal transmission line input 10 and a second input is a branch transmission line input 20. Moreover, a first output is a main signal transmission line output 11 and a second output is a branch transmission line output 21.

An optical ADM 1, namely, an add drop multiplexer is a wavelength multiplex element which is used for inserting a particular wavelength of light to a plurality of designated wavelengths of light so as to have the wavelength multiplexed. The ADM 1 is also an element which is used for branching off a particular wavelength of light out of a plurality of designated wavelengths of light.

Two optical couplers 2 and 3 are optical coupling elements among which the optical coupler 2 conducts an optical separation with one input and two outputs, and the optical coupler 3 conducts an optical coupling with two inputs and one output. The optical amplifier 4 is an optical amplifier in which the state of on or off of the amplifying operation is controlled by applying the designated voltage Vo to the driving terminal.

As to the connection relation among the constituent parts of the branching system of the present invention, the input of the optical ADM 1 is connected to the main signal transmission line input 10 of the branching system 5 and the output of the optical ADM 1 is connected to the main signal transmission line output 11 of the branching system 5. Moreover, the optical branch signal line of the optical ADM 1 is connected to the input of the optical coupler 2, while the optical insertion signal line is connected to the output of the optical coupler 3. One output of the optical coupler 2 is connected to the branch transmission line output 21 of the branching system 5, and the other output of the optical coupler 2 is connected to the input of the optical amplifier 4. One input of the optical coupler 3 is connected to the branch transmission line input 20 of the branching system 5, while the other input of the optical coupler 3 is connected to the output of the optical amplifier 4. The branching system 5 having the mentioned internal connection relation has the main signal transmission line input 10 connected to the terminal office A and the main signal transmission output 11 connected to the terminal office B. Furthermore, the branch transmission line input 20 is connected to the branch office C, while the branch transmission line output 21 is connected to the branch office C.

Figure 2:
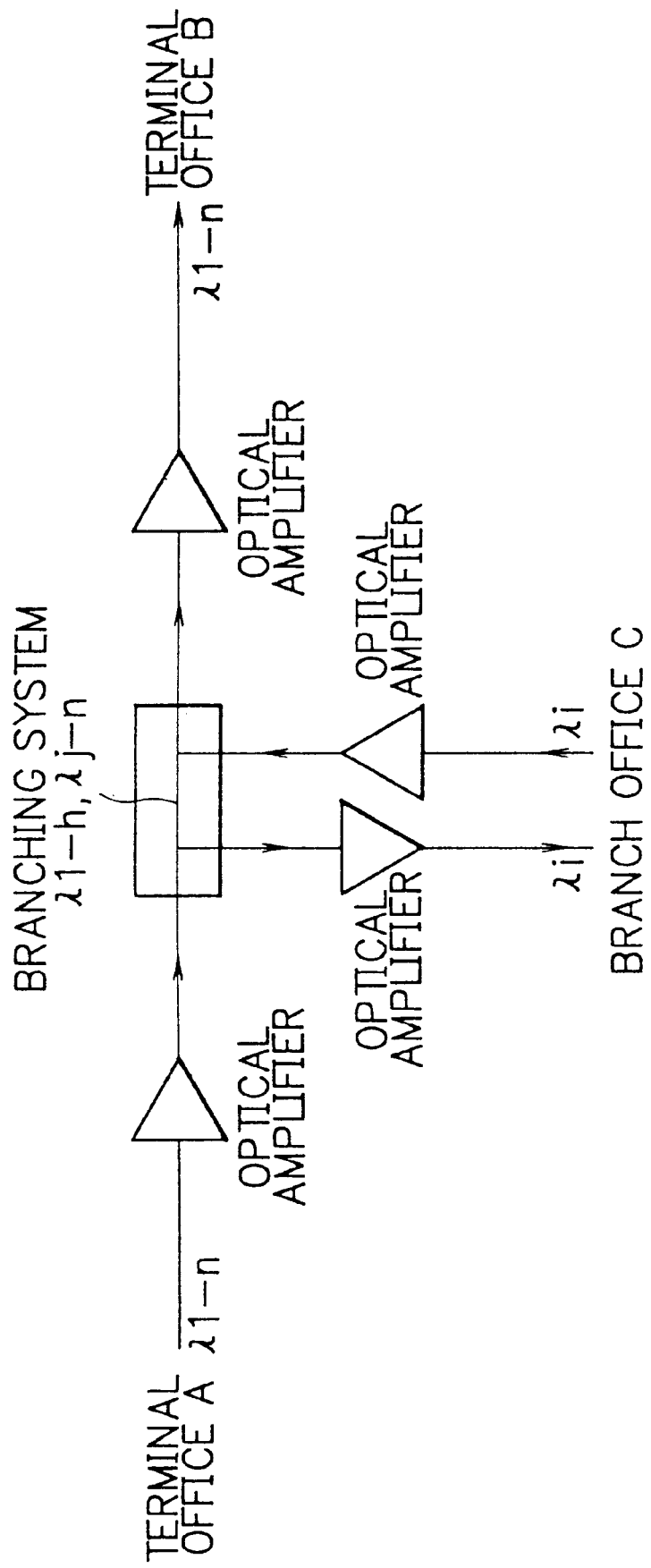
FIG. 2 is a block diagram for explaining optical branching and insertion in the wavelength multiplex transmission with respect to the conventional branching system and the system unit as a whole.
Figure 3:
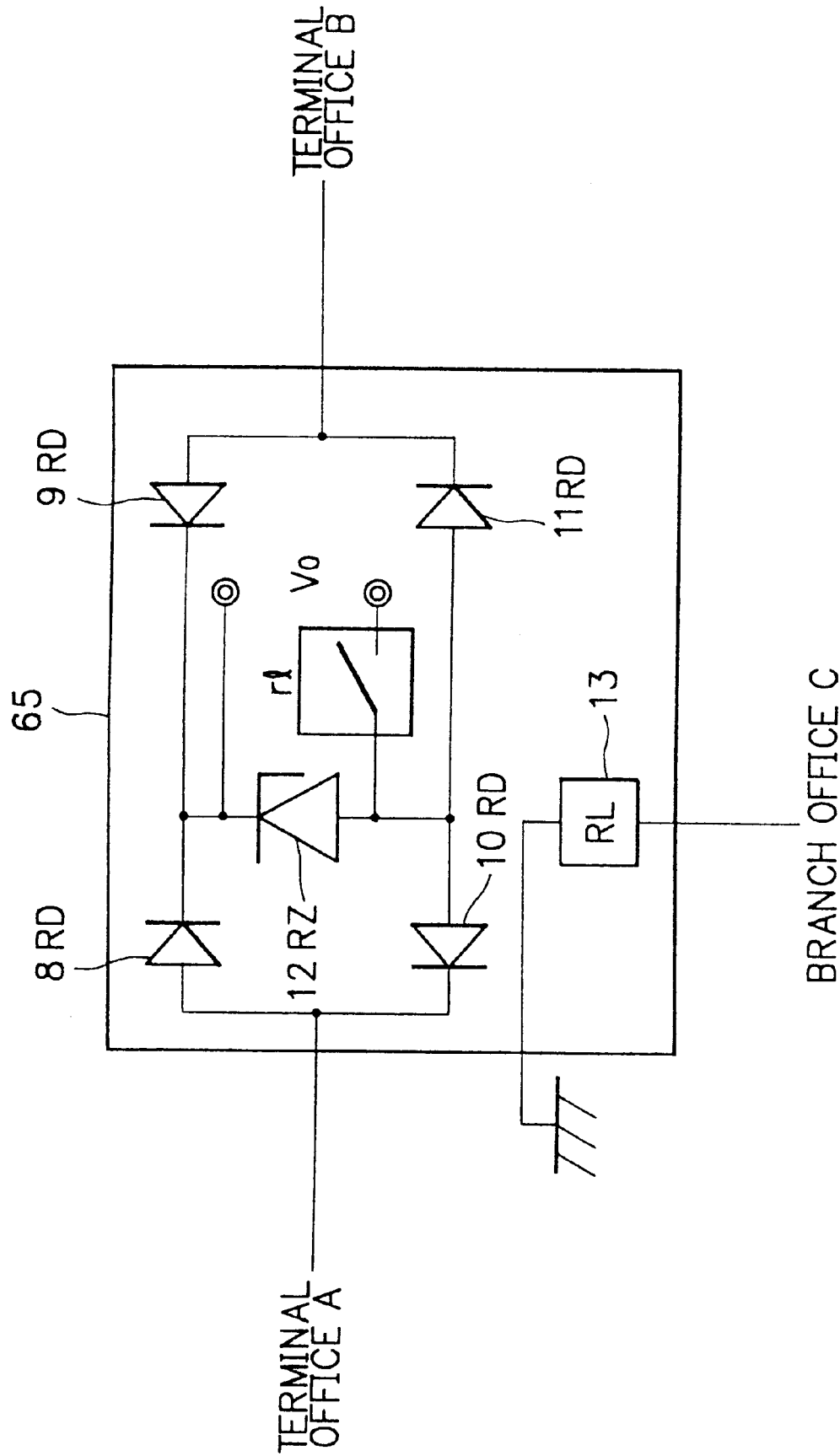
FIG. 3 is a block diagram of a conventional feeder circuit.

Now, the branching system 5 of the present embodiment as constructed in the above-mentioned manner is to be described. First of all, the description of the operation of the optical amplifier 4 is to be given. The block structure and the connection state of the system as a whole is the same as the conventional example shown in FIG. 2. The optical amplifier 4 has an insertion loss of about −30 dB when the voltage Vo is not being applied, which indicates that the transmission line is of a state the same as being off. On the other hand, the optical amplifier 4 is to operate as an optical amplifier when the voltage Vo is applied, which indicates that the transmission line is to become of a conductive state. Furthermore, the feature of the optical amplifier 4 is that the gain is being initialized so that the wavelengths λ1–h and λj–n which are not being branched off at the optical ADM 1 at the time of signal multiplexing and the wavelength λi which is being branched off so as to pass through the optical amplifier 4 become the same.

Under the normal conditions, the optical amplifier 4 is of the state where there is no voltage Vo applied thereto. Therefore, it is of the off sate. Under this particular state, the designated wavelength λi among the wavelengths λ1–n is to be branched off at the optical ADM 1. This designated wavelength λi being branched off is to be transmitted from the optical branch signal line to the branch transmission line output 21 of the branching system 5 passing through the optical coupler 2. Moreover, the wavelength λi from the branch office C is to be transmitted to the branch transmission line input 20 of the branching system 5 so as to be inputted to the optical insertion signal line of the optical ADM 1. Then the wavelength λi is to be integrated with the main signals λ1–h and λj–n with a result that the wavelengths λ1–n are transmitted to the main signal transmission line output 11 so as to be sent to the terminal office B.

Under this method, for example, if the optical fiber cables are cut off between the branching system 5 and the branch office C, the wavelength λi is not to be inputted to the branch transmission line input of the branching system 5.

Thus, the wavelength λi is not able to be transmitted to the terminal office B. In order to prevent this from happening, the voltage Vo is applied to the optical amplifier 4 so as to lead the optical amplifier 4 to become of a conductive sate, under which the wavelength λi being branched off at the optical ADM1 is to pass through the optical coupler 2, the optical amplifier 4 and the optical coupler 3 to be eventually transmitted to the optical insertion signal line of the optical ADM 1. The state of on or off of the voltage Vo is capable of being controlled by the presence or absence of the current supply from the branch office, as being mentioned in the explanation for the operation of the conventional example.

The level of the signal of the optical insertion signal line needs to be adjusted so as to match with the level of the signal of the main signal line which is not being branched off. Thus, under the normal conditions, the signal level is adjusted as such by being manipulated at the branch office C. However, when there is no signal coming from the branch office C, the signal of the optical insertion signal line is to pass through the optical coupler 2 and optical coupler 3 which results in a loss of 6 dB. Therefore, the signal level can be adjusted by setting the optical amplifier 4 as +6 dBm.

Figure 5:
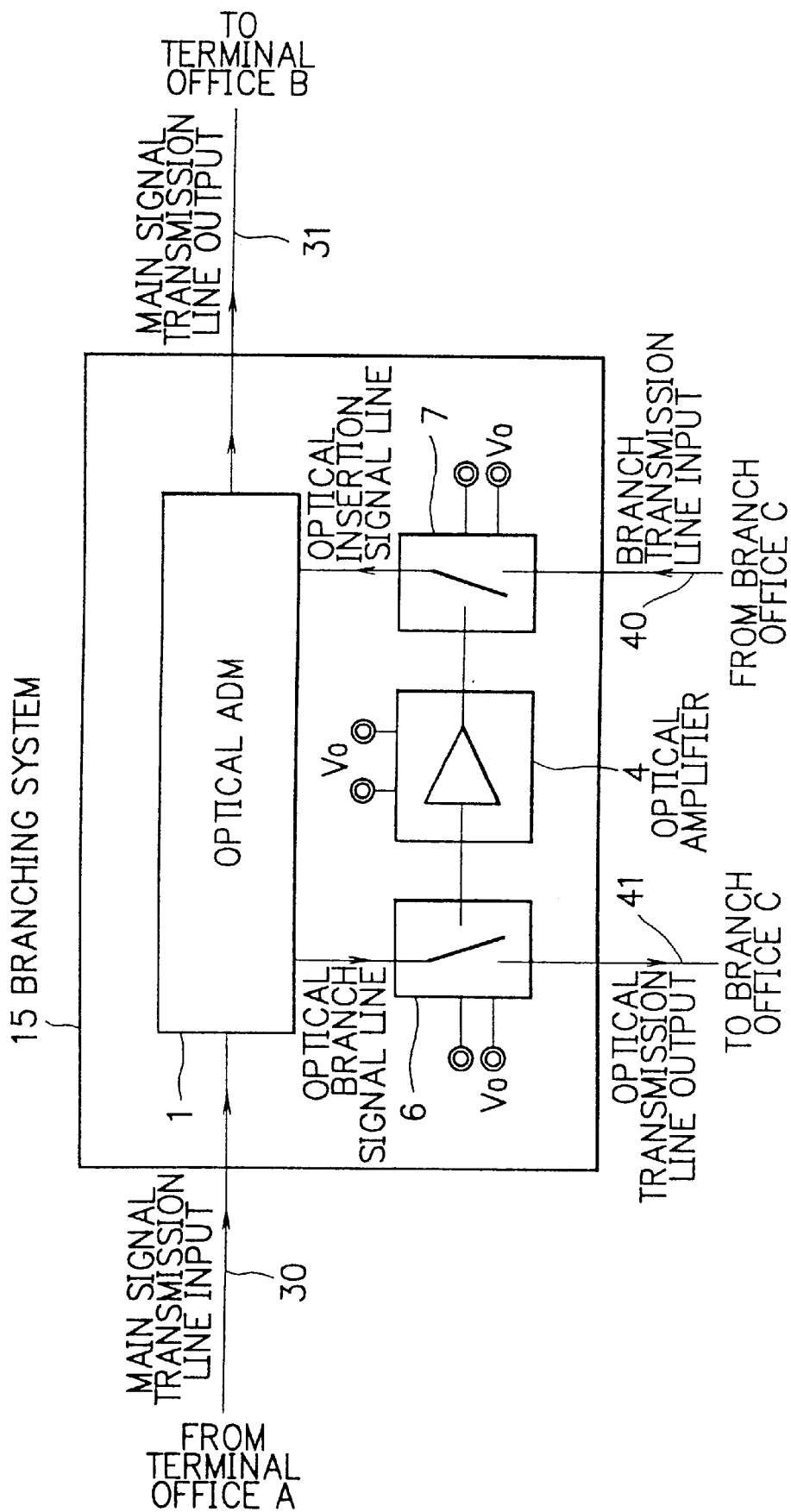
FIG. 5 is a block diagram showing a branching system of a second embodiment of the present invention.

FIG. 5 is a block diagram of the second embodiment of the branching system of the present invention. A branching system 15 of the present embodiment consists of optical switches 6 and 7 in stead of the optical coupler 2 being connected to the optical branch signal line and the optical coupler 3 being connected to the optical insertion signal line both of which being described in the first embodiment. Therefore, the operation content of a terminal office A of the main signal transmission line input 30 and a terminal office B of a main signal transmission line output 31 is the same as those described in the above mentioned first embodiment. However, concerning the connections of a branch transmission line input 40 and a branch transmission line output 41, the operation content of the branching system 15 differs from the branching system 5 of the first embodiment.

Under the normal conditions, the optical switch 6 has the optical branch signal line and the branch transmission line output 41 of the branching system 15 connected thereto, while the optical switch 7 has the optical insertion signal line and the branch transmission line input 40 of the branching system 15 connected thereto. As to the operation of the optical switches 6 and 7, each of the optical switches 6 and 7 is switched so as to be connected to the output of the optical amplifier 4 illustrated in the figure. Furthermore, as to the arrangement for the optical couplers 2 and 3 shown in FIG. 4, and the optical switches 6 and 7 shown in FIG. 5, it can be the combination of the two of a kind or the mixture combination of the two of different kinds. In any cases, there is no problem with regard to the construction of the branching system.

Next, with respect to the first and the second embodiments of the present invention, the description will be given particularly of the optical ADM within the branching system constructed with optical circulators and a fiber black grating. The description will relate to the problems concerning the optical ADM being constructed with optical circulators and a fiber black grating (hereafter referred as FBG), and to the means for overcoming those problems.

Figure 6:
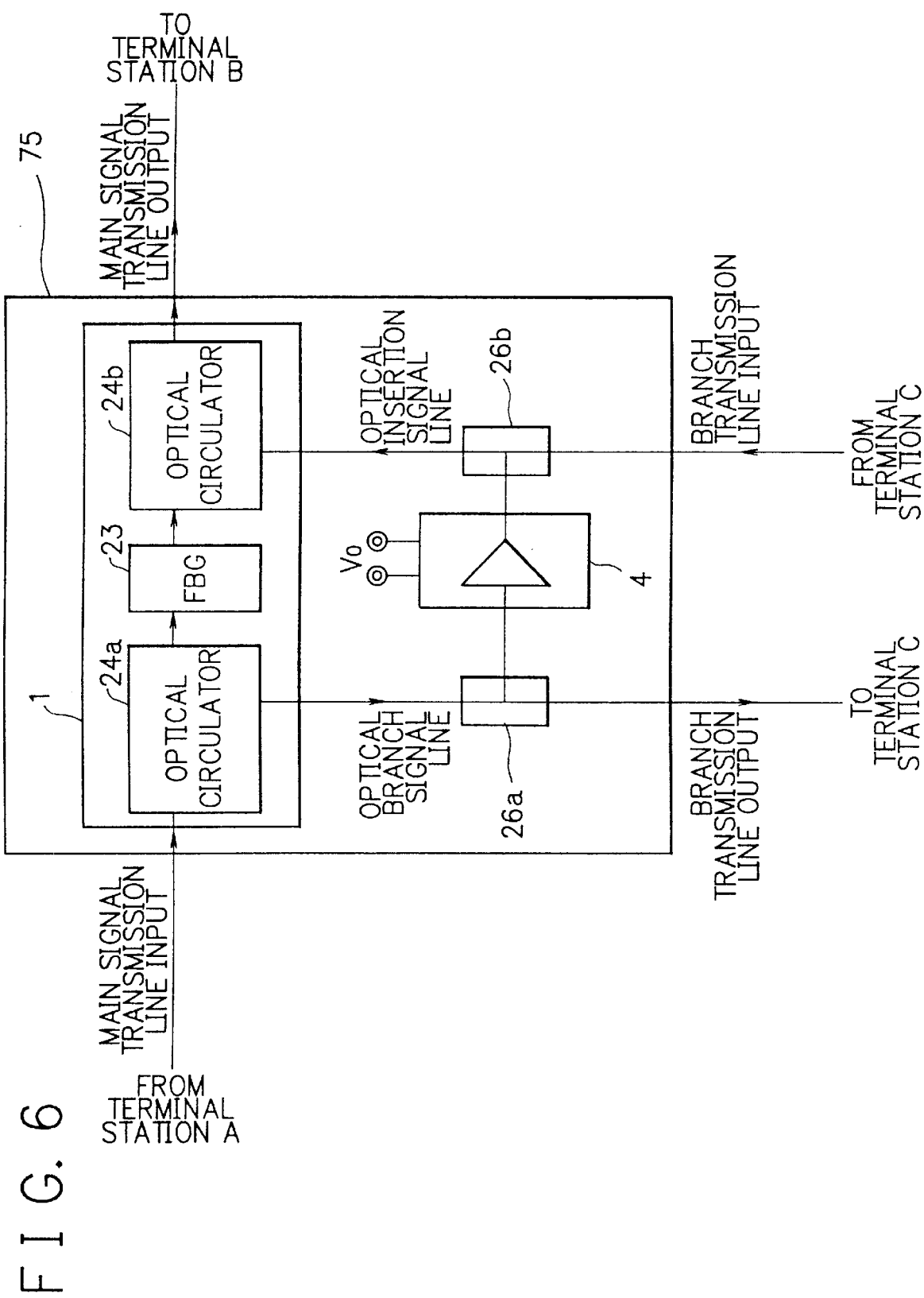
FIG. 6 is a block diagram showing a branching system with a conventional optical ADM being constructed with an optical circulator and a FBG.

FIG. 6 shows the branching system in a case where the optical ADM within the branching system consists of optical circulators and a fiber black grating. According to FIG. 6. a main signal transmission line input of a branching system 75 is connected to an input of an optical circulator 24a. An output of the optical circulator 24a is outputted to an output of a FBG 23. The FBG 23 is a device for diffracting the light and here the reflected components are to pass through the optical circulator 24a so as to be outputted to an optical branch circuit 26a. Moreover, the optical components being permeated through the FBG 23 is to be outputted to an optical circulator 24b.

Among the two outputs of the optical branch circuit 26a, one output is connected to the branch transmission line output while the other output is outputted to the optical amplifier 4. The output of the optical amplifier 4 is outputted to the optical branch circuit 26b. Furthermore, among the two inputs of the optical branch circuit 26b, one input is connected to the branch transmission line input stretching from a terminal station C. The output of the optical branch circuit 26b is connected to the input of the optical circulator 24b by the optical insertion signal line. The output of the optical circulator 24b is connected to a terminal station B by the main signal transmission line output.

When this particular structure for the optical ADM is applied to the conventional branching system, as an obstruction occurs on the transmission line of the branch office side, the conventional branching system would detect that the power supply is off on the route where the obstruction is generated after which the optical amplifier 4 would operate, and the branch signal from the optical branch circuit 26a would again integrate with the main signals after passing through the optical amplifier 4 and the optical branch circuit 26b.

However, with this conventional technology, when the optical ADM within the branching system is constructed with optical circulators and a FBG, as obstructions are generated and the branch signal detours at the optical amplifier 4 so as to be integrated with the main transmission line, there is noted the problem that the transmission feature of the main transmission line deteriorates.

The reason for this is explained in the following. As the optical amplifier 4 starts operating as the obstructions are generated on the transmission line, the output from the optical amplifier 4 is to pass through the optical branch circuit 26b and the optical circulator 24b after which it is divided into a component to be reflected and a component to be permeated. Since the component to be permeated is inputted again to the optical amplifier 4 after passing through the optical circulator 24a and the optical branch circuit 26a, there is generated a loop. Under this situation, however, the gain in case of making one round of the loop is to surpass the passing loss at the vicinity of the wavelength where the gain of the optical amplifier 4 reaches the maximum. Therefore, there is generated an oscillation which leads to an increase of noise components of the oscillation wavelength in the main transmission line.

Accordingly, as to a third embodiment of the branching system of the present invention, there is described with reference to FIG. 7, a branching system where there is no deterioration of transmission feature on the main transmission line even if the optical ADM consists of circulators and FBGs.

Figure 7:
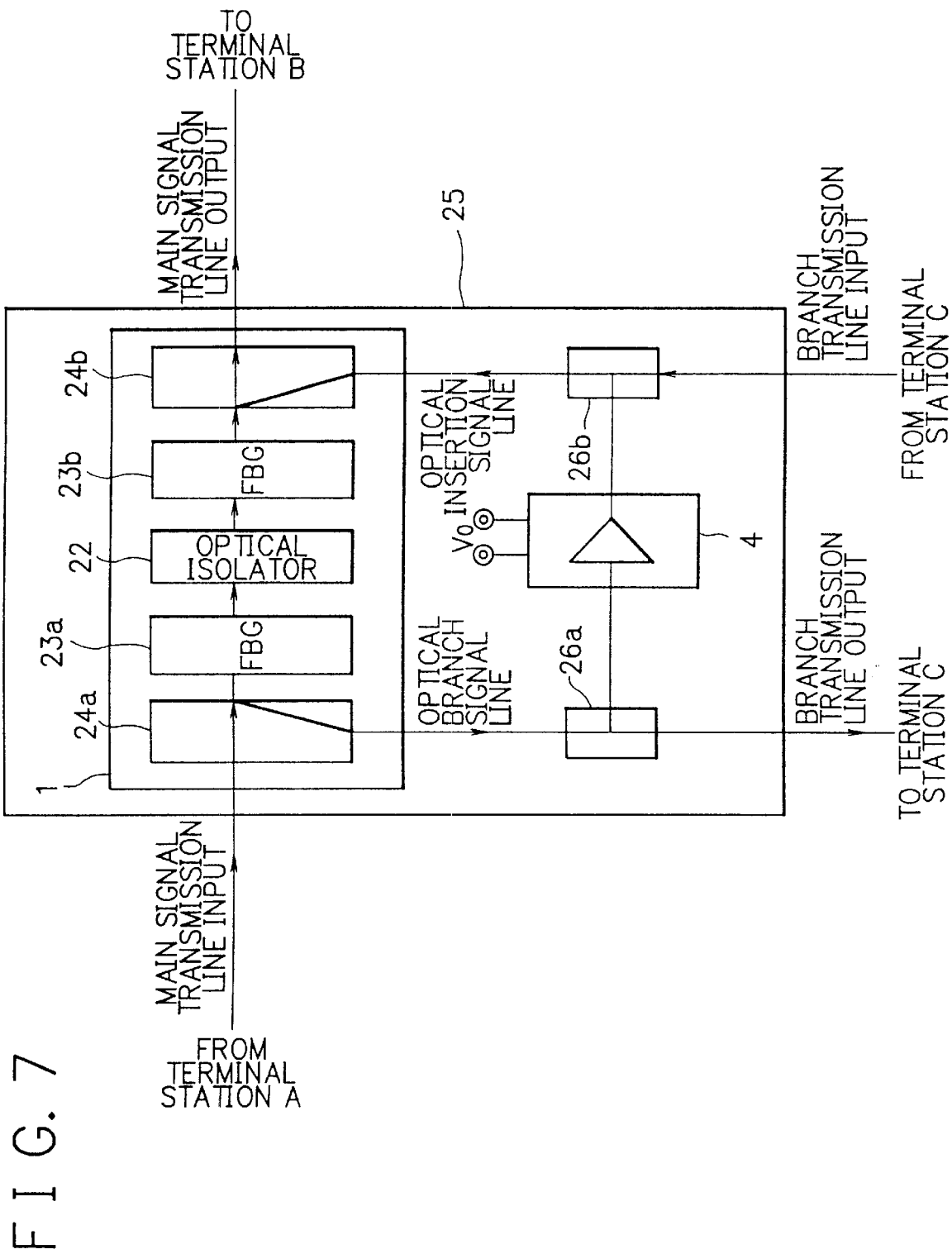
FIG. 7 is a block diagram showing a branching system of a third embodiment of the present invention.

FIG. 7 is a block diagram illustrating the third embodiment of the branching system of the present invention. A branching system 25 of the present embodiment consists of an optical ADM 1, two optical branch circuits 26a and 26b and an optical amplifier 4. Moreover, the optical ADM 1 which is the distinctive feature of the third embodiment comprises two optical circulators 24a and 24b, two FBGs 23a and 23b and an optical isolator 22. Furthermore, either optical couplers or optical switches can be used as the optical branch circuits 26a and 26b of the present embodiment.

In the branching system 25 of the third embodiment shown in FIG. 7, a main signal transmission line input from a terminal station A is connected to an input of the first optical circulator 24a, a first output of the optical circulator 24a is connected to an input of the first FBG 23a, and an output of the FBG 23a is connected to the optical isolator 22. An output of the optical isolator 22 is connected to an input of the second FBG 23b, and an output of the second FBG 23b is connected to a first input of the second optical circulator 24b. On the other hand, a second output of the first optical circulator 24a is connected to an input of the first optical branch circuit 26a, and an output from a first output of the first optical branch circuit 26a is to be transmitted to a terminal station C as a branch signal. In the meantime, a second output of the first optical branch circuit 26a is connected to the input of the optical amplifier 4, and an output of the optical amplifier 4 is connected to a first input of the second optical branch circuit 26b. The multiplexed signal from the terminal office C is to be connected to a second input of the second optical branch circuit 26b, while the output of the second optical branch circuit 26b is to be connected to a second input of the second optical circulator 24b, and an output from the optical circulator 24b is to be transmitted to the terminal office B.

Next, an example of the operation of the present embodiment will be given. In the case where the branch transmission line is cut off due to obstructions, the optical amplifier 4 is to detect the situation so as to operate accordingly. The signal being branched off at the first optical circulator 24a is to detour taking the following course: the first optical branch circuit 26a→the optical amplifier 4→the second optical branch circuit 26b→the second optical circulator 24b. In this event, the permeated signals among the signals being inputted to the second FBG 23b from the second optical circulator 24b are to be intercepted at the optical isolator 22 which will result in not causing the situation where a loop is generated.

In addition, as to the present embodiment, a vacuum relay is used to operate the optical amplifier in such a case where the branch transmission line is being cut off due to obstructions. This vacuum relay is connected to the branching system in such manner that the power supply at the optical amplifier is cut off when the power supply is being applied to the branch transmission line while the power supply at the optical amplifier is turned on when the power supply is being cut off at the branch tranmission line. Moreover, the optical couplers or optical switches for switching the optical route by the vacuum relay are to be used as the optical branch circuits. Furthermore, two of the FBGs within the optical ADM are to be similar to each other in their features so that they would not deteriorate the transmission feature of the signals to be permeated.

According to the above mentioned structure and operation of the present embodiment, when the branch transmission line is cut off due to obstructions, the optical amplifier 4 is to detect the situation and start the operation. Then the signal being branched off at the first optical circulator 24a is to detour taking the following course: the first optical branch circuit 26a→the optical amplifier 4→the second optical branch circuit 26b→the second optical circulator 24b. In this event, the permeated signals among the signals being inputted to the second FBG 23b from the second optical circulator 24b are to be intercepted at the optical isolator 22 which will result in not generating a loop even when the branch signals are detouring. Therefore, there should be no deterioration of the transmission feature of the main transmission line generated by the increase of noise components of the oscillation wavelength at the main transmission line caused by the generation of the oscillation.

Next, as to a forth embodiment of the branching system of the present invention, there is described with reference to FIG. 8, a branching system with another form where increase of noise components of the oscillation wavelength and deterioration of transmission feature on the main transmission line are prevented even when the optical ADM consists of circulators and a FBG.

The structure of the forth embodiment of the branching system according to the present invention is described with reference to FIG. 8. One feature of the forth embodiment is that the optical ADM 1 consists of two optical circulators 24a and 24b and one FBG. Another feature of the present embodiment is that the output from the optical amplifier 4 is not directly connected to an optical branch circuit 26b, but there is adopted a bandwidth permeation device in between the optical amplifier 4 and the optical branch circuit 26b.

Figure 8:
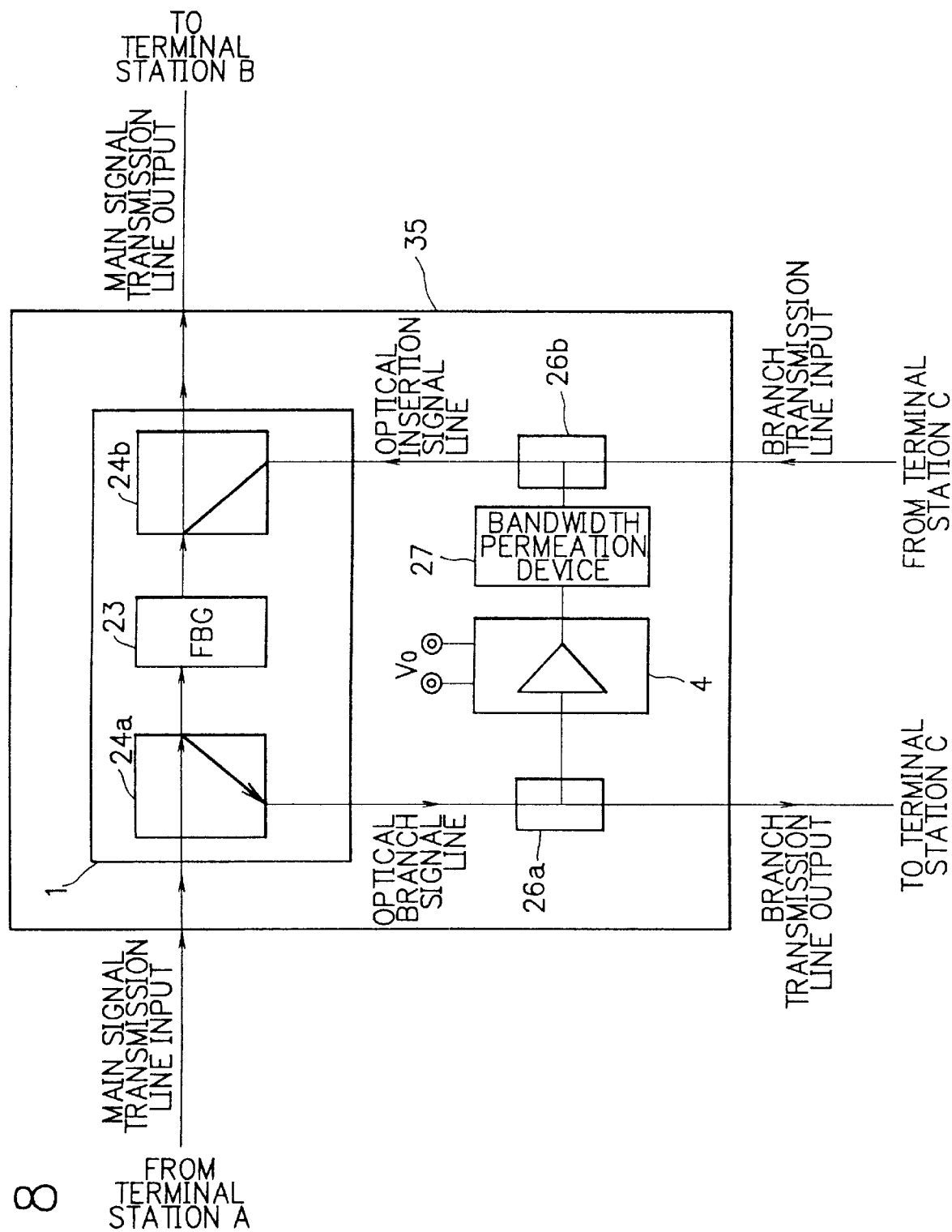
FIG. 8 is a block diagram showing a branching system of a forth embodiment of the present invention.

According to the present embodiment shown in FIG. 8, a main signal transmission line input from a terminal station A is connected to an input of the first optical circulator 24a while a first output of the first optical circulator 24a is connected to an input of a FBG 23. An output of the FBG 23 is connected to a first input of the second optical circulator 24b. On the other hand, a second output of the first optical circulator 24a is connected to an input of a first optical branch circuit 26a while an output from a first output of the first optical branch circuit 26a is transmitted to a terminal station C as a branch signal. In the meantime, a second output of the first optical branch circuit 26a is connected to an input of the optical amplifier 4 while an output of the optical amplifier 4 is connected to an input of a bandwidth permeation device 27. An output of the bandwidth permeation device 27 is connected to a first input of a second optical branch circuit 26b. Meanwhile, the multiplexed signal from the terminal station C is to be connected to a second input of the second optical branch circuit 26b, while an output of the second optical branch circuit 26b is to be connected to a second input of the second optical circulator 24b, and an output from the second optical circulator 24b is to be transmitted to a terminal station B.

Additionally, as to the present embodiment, either optical couplers or optical switches for switching the optical route by the vacuum relay are to be used as optical circuits.

The vacuum relay is used to operate the optical amplifier in such a case where the branch transmission line is being cut off due to obstructions. This vacuum relay is connected to the branching system in such manner that the power supply at the optical amplifier is cut off when the power supply is being applied to the branch transmission line while the power supply at the optical amplifier is turned on when the power supply is being cut off at the branch transmission line.

Next, an example of the operation of the present embodiment will be given. In the case where the branch transmission line is cut off due to obstructions, the optical amplifier 4 is to detect the situation so as to operate accordingly. The signal being branched off at the first optical circulator 24a within the optical ADM 1 is to detour taking the following course: the first optical branch circuit 26a→the optical amplifier 4→the bandwidth permeation device 27→the second optical branch circuit 26b→the second optical circulator 24b. In this event, even when there is generated a loop, for the bandwidth permeation device 27 eliminates the noise components caused by the oscillation, there should be no influence whatsoever on the transmission feature.

Figure 9A:
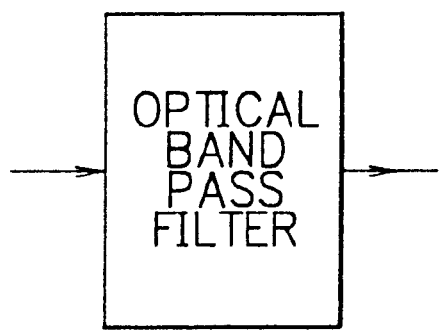
FIGS. 9A and 9B are views showing a bandwidth permeation device applied in the branching system of the forth embodiment of the present invention.

The structure of the bandwidth permeation device to be used for a detour route is illustrated in FIG. 9. FIG. 9A shows the case in which the bandwidth permeation device is an optical band pass filter. The bandwidth of the optical band pass filter to be used should be narrower than the permeation bandwidth of the FBG within the optical ADM as indicated in FIG. 10. Therefore, since the bandwidth permeation device 27 eliminates the noise components at the vicinity of the wavelength where the gain reaches at its maximum, the noise components caused by the oscillation can be removed.

Figure 9B:
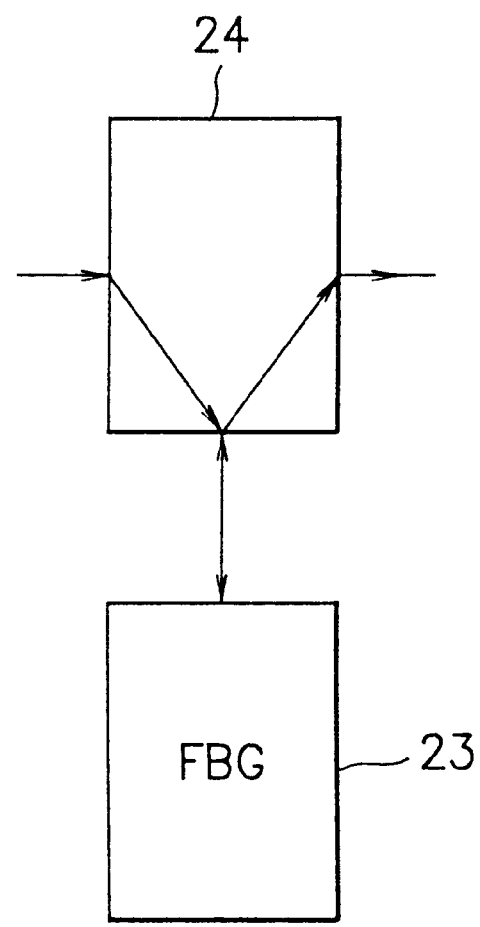

FIG. 9B shows the case in which the bandwidth permeation device is constructed with the optical circulator and the second FBG. As to the inflection bandwidth of the second FBG, the bandwidth should be narrower than the permeation bandwidth of the FBG within the optical ADM as indicated in FIG. 10. Accordingly, since the bandwidth permeation device 27 eliminates the noise components at the vicinity of the wavelength where the gain reaches at its maximum, the noise components caused by the oscillation can be removed.

According to the above mentioned structure and operation of the present embodiment, when the branch transmission line is cut off due to obstructions, the optical amplifier 4 is to detect the situation and start the operation. Then the signal being branched off at the first optical circulator 24a is to detour taking the following course: the first optical branch circuit 26a the optical amplifier 4→the bandwidth permeation device 27→the second optical branch circuit 26b→the second optical circulator 24b in this event, even such detour route is to be taken, for the bandwidth permeation device 27 eliminates the noise components at the vicinity of the wavelength where the gain reaches at its maximum, the noise components caused by the oscillation can be removed, and there should be no influence whatsoever on the main signal transmission line.

The first effect expected from each of the above mentioned embodiments of the present invention is that the relay intervals of the optical amplifiers before and behind the branching system can be prolonged which leads to a decrease of insertion loss of the branching system. Moreover, owing to the less insertion loss, there is generated extra scope for the system design.

The mechanism for gaining the above mentioned effect is as follows. By connecting either the optical couplers or the optical switches to the signal lines being branched from or inserted to the main signals due to the optical ADM, and further connecting the optical amplifier, there can be constructed a branch transmission line where there is no signal coming from the branch office. Accordingly, there should be no need for optical switches or optical couplers which are causing insertion loss in the main signal transmission line. Hence, insertion loss of the branching system can be decreased.

Furthermore, the effect noted in the third and the forth embodiment of the present invention is that, where the optical ADM is constructed with the optical circulators and FBGs, even when the branch signal has to detour due to obstructions on the branch transmission line, there should be no influence on the transmission feature of the main signal transmission line.

In the case of the third embodiment, the above advantage is acquired for there is no loop generated at the time of detouring of the branch signal. In the case of the fourth embodiment, the above effect is obtained for the noise components can be removed at the vicinity of the wavelength where the gain is to reach its maximum even if a loop is generated, which results in not inducing the oscillation.

As it has been made clear by the above descriptions of the present invention, according to the first aspect of the invention, there is provided a branching system where the optical ADM has a first input connected to a main signal transmission line input of the branching system, a first output connected to a main signal transmission line output of the branching system, a second input connected to the second optical coupling device and a second output connected to the first optical coupling device, the first optical coupling device has a first output connected to the branch transmission line output of the branching system and a second output connected to an input of the optical amplifier, the second optical coupling device has a first input connected to the branch transmission line input of the branching system and a second input connected to an output of the optical amplifier.

Owing to the above structure, there is provided a branching system with less insertion loss having an optical ADM function for branching or inserting a particular wavelength from a plurality of wavelengths in the WDM transmitting. Thus, the transmission efficiency of the optical transmission line can be improved while the relay intervals of the optical amplifiers before and behind the branching system can also be extended, which leads to a generation of extra scope for the system design.

Moreover, according to the second aspect of the present invention, there is provided a branching system where the optical ADM comprises a first optical circulator with one input and two outputs, a first optical diffraction device with one input and one output, an optical isolator with one input and one output, a second optical diffraction device with one input and one output, and a second optical circulator with two inputs and one output, the first optical circulator has an input connected to the main signal transmission line input, a first output connected to the first optical coupling device and a second output connected to the input of the first optical diffraction device, the optical isolator has an input connected to the output of the first optical diffraction device and an output connected to an input of the second optical diffraction device, the second optical circulator has a first input connected to an output of the second optical diffraction device and a second input connected to the second optical coupling device.

Thus, according to the above structure, when the branch transmission line is cut off due to the obstructions, the optical amplifier is to detect the situation and start the operation. Then the signal being branched off at the first optical circulator is to detour taking the following course: the first optical coupling device→the optical amplifier→the second optical coupling device→the second optical circulator. In this event, even when such detouring route is to be taken, the permeated signals among the signals being inputted to the second optical diffraction device from the second optical circulator are to be intercepted at the optical isolator which will not result in generating a loop. Therefore, there should be no deterioration of the transmission feature of the main transmission line generated by the increase of noise components of the oscillation wavelength at the main transmission line caused by the generation of the oscillation.

Furthermore, according to the third aspect of the present invention, there is provided a branching system where the optical ADM comprises a first optical circulator with one input and two outputs, an optical diffraction device with one input and one output, and a second optical circulator with two inputs and one output, the first optical circulator has an input connected to the main signal transmission line input, a first output connected to the first optical coupling device and a second output connected to the input of the optical diffraction device, the optical diffraction device has an output connected to an input of the second optical circulator, the second optical circulator has a first input connected to an output of the optical diffraction device, a second input connected to the second optical coupling device and an output connected to the main signal transmission line output, a bandwidth permeation device is connected in between an output of the optical amplifier and an input of the second optical coupling device.

Thus, according to the above structure, when the branch transmission line is cut off due to the obstructions, the optical amplifier is to detect the situation and start the operation. Then the signal being branched off at the first optical circulator is to detour taking the following course: the first optical coupler→the optical amplifier→the bandwidth permeation device→the second optical coupler→the second optical circulator. In this event, even such detour route is to be taken, for the bandwidth permeation device eliminates the noise components at the vicinity of the wavelength where the gain reaches at its maximum, the noise components caused by the oscillation can be removed, and there should be no influence whatsoever on the main signal transmission line.

While preferred embodiments of the invention have been described using specific terms, such descriptions are simply set as examples of the embodiments which are not whatsoever intended as limitation to the present invention, and it is to be understood that changes and variations may be made without departing from the spirit or the scope of the following claims.

What is claimed is:

1. A branching system having an optical ADM function for branching or inserting a particular wavelength from a plurality of wavelengths in a WDM transmission comprising:

an optical ADM with two inputs and two outputs for branching or inserting a particular wavelength from a plurality of wavelengths;

a first optical coupling device with one input and two outputs for controlling optical coupling among the one input and the two outputs thereof;

a second optical coupling device with two inputs and one output for controlling the optical coupling among the two inputs and one output thereof; and an optical amplifier for amplifying the optical signal, said optical ADM having a first input connected to a main signal transmission line input of the branching system, a first output connected to a main signal transmission line output of the branching system, a second input connected to the second optical coupling device, and a second output connected to the first optical coupling device, said first optical coupling device having a first output connected to the branch transmission line output of the branching system, and a second output connected to an input of the optical amplifier, said second optical coupling device having a first input connected to the branch transmission line input of the branching system, and a second input connected to an output of the optical amplifier.

2. A branching system according to claim 1, wherein the first and/or the second optical coupling device(s) are/is (an) optical coupler(s).

3. A branching system according to claim 1, wherein the first and/or the second optical coupling device(s) are/is (an) optical switch(es).

4. A branching system according to claim 1, the optical ADM comprising:

a first optical circulator with one input and two outputs;

a first optical diffraction device with one input and one output;

an optical isolator with one input and one output;

a second optical diffraction device with one input and one output; and a second optical circulator with two inputs and one output, said first optical circulator having an input connected to the main signal transmission line input, a first output connected to the first optical coupling device, and a second output connected to the input of the first optical diffraction device, said optical isolator having an input connected to the output of the first optical diffraction device, and an output connected to an input of the second optical diffraction device, said second optical circulator having a first input connected to an output of the second optical diffraction device, and a second input connected to the second optical coupling device.

5. A branching system according to claim 1, wherein:

the first and/or the second optical diffraction device(s) are/is (a) fiber black grating(s).

6. A branching system according to claim 1, the optical ADM comprising:

a first optical circulator with one input and two outputs;

an optical diffraction device with one input and one output; and a second optical circulator with two inputs and one output, said first optical circulator having an input connected to the main signal transmission line input, a first output connected to the first optical coupling device, and a second output connected to the input of the optical diffraction device, said optical diffraction device having an output connected to an input of the second optical circulator, said second optical circulator having a first input connected to an output of the optical diffraction device, a second input connected to the second optical coupling device, and an output connected to the main signal transmission line output, a bandwidth permeation device being connected in between an output of the optical amplifier and an input of the second optical coupling device.

7. A branching system according to claim 1, wherein the bandwidth permeation device is a band pass filter.

8. A branching system according to claim 1, wherein the bandwidth permeation device consists of an optical circulator and an optical diffraction device.

9. A branching system according to claim 1, wherein the optical diffraction device is a fiber black grating.

* * * * *